United States Patent

[11] 3,600,800

[72] Inventors Hisateru Akachi
Yokohama;
Masaki Hagi, Tokyo; Yoshihiro Nita,
Tokyo, all of, Japan
[21] Appl. No. 796,864
[22] Filed Feb. 5, 1969
[45] Patented Aug. 24, 1971
[73] Assignee Oki Densen Kabushiki Kaisha
Kanagawa, Japan
[32] Priority July 26, 1968
[33] Japan
[31] 43/52862

[54] METHOD OF MANUFACTURING WIRE MEMORY PLANE
3 Claims, 26 Drawing Figs.

[52] U.S. Cl. .......... 29/604, 340/174 M, 340/174 QB, 340/174 TF, 340/174 PW, 29/625
[51] Int. Cl. .......... H05k 3/10, G11c 11/14
[50] Field of Search .......... 340/174; 29/604, 625

[56] References Cited
UNITED STATES PATENTS

| | | | |
|---|---|---|---|
| 3,221,312 | 11/1965 | MacLachlan | 340/174 |
| 3,324,014 | 6/1967 | Modjeska | 29/625 X |
| 3,448,514 | 6/1969 | Reid et al. | 29/604 |
| 3,465,308 | 9/1969 | Sasaki et al. | 340/174 |
| 3,495,228 | 2/1970 | Bryzinski et al. | 340/174 |
| 3,518,636 | 6/1970 | Pulliam et al. | 340/174 |

OTHER REFERENCES

IBM Technical Disclosure Bulletin, " Flexible Keeper Bars For Thin-Film Memory" by Agajanian et al., Vol. 8, No. 12; 5/66, p. 1827 & 1828 copy in 340- 174 Keeper

*Primary Examiner*—Stanley M. Urynowicz, Jr.
*Attorney*—Kelman and Berman

ABSTRACT: A wire memory plane comprising two parallel word line plates of thermosetting or thermoplastic resin plates formed with a large number of word lines arranged parallel to one another on one side of each of said resin plates such that one surface of each of said word lines is exposed, and a thermosetting or thermoplastic resin plate formed with a large number of digit wires arranged parallel to one another and embedded in said resin plate, said former two resin plates being laid one over another with the sides thereof on which the word lines are exposed being in face-to-face relationship and said latter resin plate being inserted between said former resin plates with the digit wires and the word lines being disposed in right-angle relationship. The three resin plates arranged in the manner described are then joined integrally with one another.

INVENTORS.
Hisateru Akachi
Masaki Hagi
Yoshihiro Nita
BY: Kelman and Berman
AGENTS INVENTORS.
Hisateru Akachi
Masaki Hagi
Yoshihiro Nita
By: Kelman and Berman
AGENTS INVENTORS.
Hisateru Akachi
Masaki Hagi
Yoshihiro Nita
BY: Kelman and Berman
AGENTS INVENTORS.
Hisateru Akachi
Masaki Hagi
Yoshihiro Nita
BY: Kelman and Berman
AGENTS

METHOD OF MANUFACTURING WIRE MEMORY PLANE

The present invention relates to a wire memory plane and a method of manufacturing same. Memory wire planes of the prior art are either formed by weaving as shown in FIG. 1 or constructed as shown in FIG. 2 by using rectangular strip wires. They each consist of digit wires 1 and word lines 2. The digit wires 1 are generally beryllium bronze wires or phosphor bronze wires having a coat of a magnetic or magnetizable alloy of about 1-inch thickness applied thereto by electrodeposition. The diameter of these magnetic wires may vary depending on their electrical properties or transmission characteristics, for example, or the construction of the matrix. At present, a magnetic wire with a diameter of 0.125 millimeter has been put into practical use. Magnetized wires that have so far been used in basic research are those with a diameter of 0.2 millimeter or 0.1 millimeter. In cases where an improved bit density is desired, a magnetic wire with a diameter of 0.1 millimeter will have a better chance of application. Characteristics of magnetic wires are markedly degraded by external forces or the like. When a wire memory plane is manufactured by weaving, pipes formed as of polycarbonate which is sufficiently hard not to be bent by weaving and which has a low coefficient of friction are used in weaving and then the magnetic wires are inserted in the pipes, or piano wires or the like which have a diameter larger than the diameter of the magnetic wire are used for weaving and then the piano wires are drawn and replaced by the magnetic wires, in order that the characteristics of the magnetic wires may not be degraded.

When strip wires are used, thermoplastic resinous plates a are subjected to a machining operation so as to form parallel grooves semicircular or triangular in shape on one surface thereof and two of these plates are superimposed one over the other to provide a laminated resin plate formed with parallel ducts (the so-called tunnel structure) in which the magnetic wires are inserted.

The processes of forming a wire memory plane described above offer the advantages of permitting the magnetic wires to be incorporated in the matrix without degrading their characteristics. However, the processes are not without disadvantages. When the wire memory planes is formed by weaving, there are limits set to the bit density (the bit density may vary depending on the structure of digit wires 1 and word lines 2 used, but is generally 25 to 100 bits per square centimeter). The use of strip wires makes the operation of forming ducts or tunnels extremely complicated. Moreover, it is difficult to form tunnels (ducts) with a diameter of below 0.3 to 0.5 millimeter, and spacing between the digit wires 1 and the word lines 2 becomes larger than it should be (the spacing may vary depending on the thickness of the resinous plate but is generally 0.2 to 0.5 millimeter), thereby degrading memory characteristics.

Preferably, the word lines and the column wires of a wire memory plane are arranged in right-angle relationship with spacing between them being minimized as long as a short circuit does not occur. In the wire memory plane of the type shown in FIG. 2, the word lines are generally rectangular wires and the digit wires are round wires, with each digit wire being interposed between two word lines.

The technique of manufacturing ribbonlike multiple core parallel wires has hitherto been applied to manufacturing readout wires for a twister memory or a metal card memory for use with a semipermanent memory device for an electronic switchboard. Unlike universal purpose ribbonlike multiple core parallel wires, those wires which are used for the purpose described above must be of high precision finish in many points including the pitch between wires. Advances made in the progress of technology have made it possible to readily manufacture ribbonlike multiple core wires of high precision finish and their method of manufacture is publicly known. Ribbonlike multiple core parallel wires are manufactured by using two flexible tapes shown in FIG. 4, each tape consisting of a thermoplastic film 3 or a polyester film with a thickness of 50 $\mu$, for example, and a layer of a thermoplastic material or a polyethylene layer 4 with a thickness of 50 $\mu$, for example, serving as an adhesion layer or a fusion layer which is bonded to the surface of said thermoplastic film 3. As is shown in FIG. 5, conductors 6 arranged parallel to one another are interposed between these two tapes which are superimposed one over the other such that the adhesion or fusion layers 4 thereof are in contact with each other, and the two tapes having conductors 6 interposed between them are caused to pass between upper and lower heated rolls 7 and 8 and heated to 130° to 150° C. so that the tapes may be pressed into an integral unit while being heated. Alternatively, the parallel wires may be manufactured not be pressing while heating but by forming parallel conductors integrally by using a synthetic resinous material, such as a butyral paint or P.V.C. pastelike paint, for example, which is dissolved in a suitable solvent. These processes make it possible to obtain parallel wires or high precision finish. Since filmlike in shape, the ribbonlike multiple core parallel wires manufactured by these processes have flexibility. Flexibility in the ribbonlike multiple core parallel wires has many an advantage depending on the use to which they are put, but flexibility is a disadvantage in the case of a wire memory plane.

Accordingly, the principal object of the present invention is to apply the process of manufacturing ribbonlike multiple core parallel wires of the type described to manufacturing a wire memory plane, so that bit density can be improved and spacing between word lines and digit wires can be reduced without damaging the magnetic wires.

Another object of the invention is to provide a wire memory plane consisting of two resin plates formed with word lines arranged in parallel relation and superimposed one over another such that surfaces thereof on which the word lines are exposed are in face-to-face relation with each other, and a resin layer formed of a thermoplastic or thermosetting resinous material and formed with digit wires embedded therein, said resin layer being inserted between said two resin plates such that the digit wires are disposed in right-angle relationship to the word lines and the two resin plates with the resin layer interposed therebetween being joined integrally.

Still another object of the invention is to provide a method of manufacturing a wire memory plane of the type described.

Other objects and advantages of the present invention will become apparent after the description hereafter set forth is considered in conjunction with the drawing annexed hereto, in which:

FIG. 5 is a schematic view in explanation of the process for manufacturing ribbonlike wires which is incorporated in the method of the present invention, showing in section two tapes and a conductor as the tapes are joined together with the conductor interposed in between;

Figure 17:
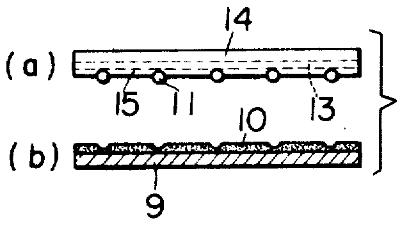
Figure 18:
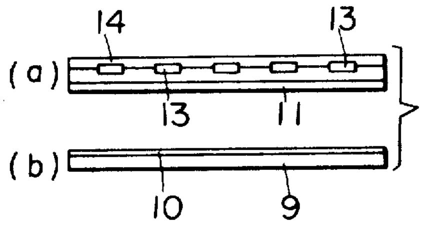
Figure 19:
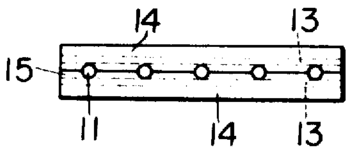
Figure 20:
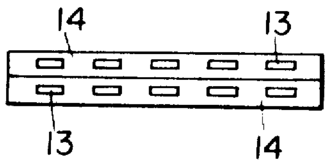
Figure 21:
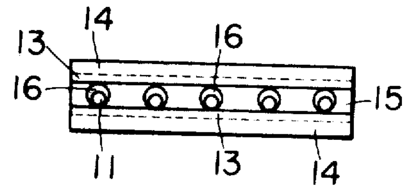
Figure 22:
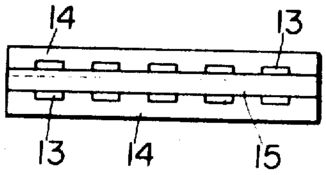
Figure 23:
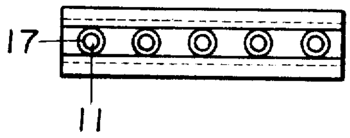
Figure 24:
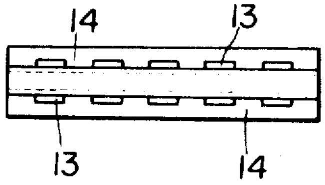
Figure 25:
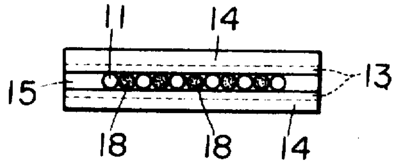
Figure 26:
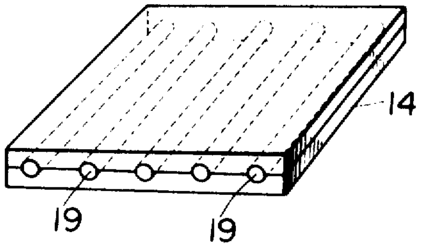

FIGS. 17 and 18 show the manner in which the tape portion having an adhesion or fusion layer is stripped off from the unit shown in FIGS. 15 and 16, FIGS. 17*a* and 18*a* showing the tape portion having parallel wires and FIGS. 17*b* and 18*b* showing the stripped tape portion having an adhesion or fusion layer;

FIGS. 19 and 20 show the manner in which the tape portion of FIGS. 17*a* and 18*a* and the resin layer of FIG. 11*a* are laid one over the other and joined into an integral unit such that the digit wires and the word lines being in right angle relation with one another, such tape unit being one embodiment the present invention;

FIGS. 21 and 22 show another wire memory plane embodying the present invention which is manufactured by the same process as described above with reference to the first embodiment except that dummy wires having a diameter slightly larger than the diameter of the digit wires are first used in various processing operations, said dummy wires to be finally removed from the wire memory plane and the column wires being inserted therein;

FIGS. 23 and 24 show still another embodiment of the present invention in which the digit wires used are magnetic wires having a coat of resilient synthetic resinous material thereon;

FIG. 25 shows a further embodiment of the wire memory plane of the present invention manufactured by laying two resin layer portions of FIG. 11*a* one over the other with the surfaces on which the word lines are exposed being in face-to-face relation with each other, arranging the digit wires parallel to one another between the two resin layers by using pitch-setting dummy wires, and then forming the two portions into an integral unit;

FIG. 26 is a perspective view of a parallel conductor plate representing an application of the present invention which is formed by attaching a resin layer portion to a resin layer portion having round conductors disposed thereon which is manufactured by the same process as the resin layer portion of FIG. 11*a*.

Several embodiments of the invention will now be explained by way of example with reference to the drawings.

EMBODIMENT I

Figure 1:
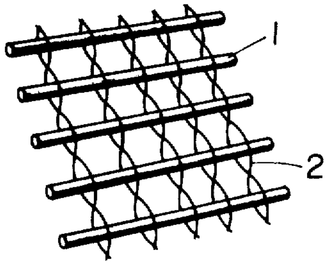
FIG. 1 PRIOR ART
FIG. 1 is a schematic view in explanation of a wire memory plane manufactured by weaving (prior art)
Figure 2:
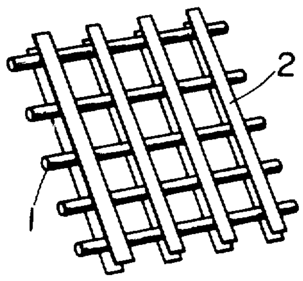
FIG. 2 PRIOR ART
FIG. 2 is a schematic view in explanation of a wire memory plane manufactured by using rectangular strip wires (prior art)
Figure 3:
FIG. 3 is a view in section showing a tape having no adhesion or fusion layer deposited thereon.
Figure 5:
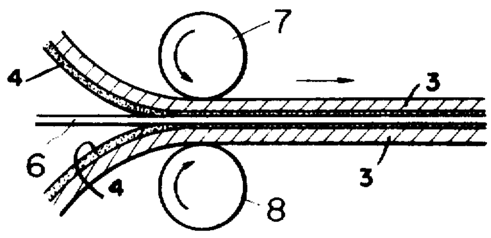
Figure 4:
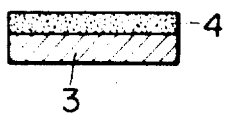
FIG. 4 is a view in section showing a tape with an adhesion or fusion layer deposited thereon.
Figure 7:
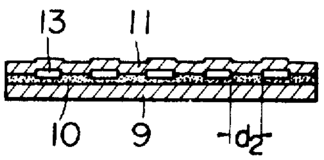
FIGS. 6 and 7 are views in section showing a tape with round, parallel digit wires and a tape with rectangular, parallel wire word lines respectively.
Figure 6:
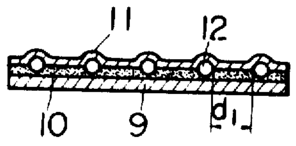

A tape with straight column wires arranged therein in parallel relation with one another as shown in FIG. 6 or a digit wire tape and a tape with straight word lines arranged therein in parallel relation with one another as shown in FIG. 7, or a word line tape are prepared by the process shown in FIG. 5. The digit wire tape is formed by inserting round magnetic wires 12 (serving as digit wires) arranged in parallel relation with one another and each consisting of conductive beryllium bronze core with a diameter of 0.1 millimeter having thereon a first coat of metal of about 1 $\mu$ thick and a coat of magnetic material about 1 $\mu$ thick on said first coat, between a tape portion consisting of a thermoplastic resin layer 9 of 50 $\mu$ thick formed polyester film and another thermoplastic resin layer 10 50 $\mu$ thick formed of polyethylene and serving as an adhesion or fusion layer joined together integrally and a tape portion 11 50 $\mu$ thick and having no adhesion of fusion layer joined thereto. The two flat tape members 9, 11 laid one over the other with said round magnetized wires 12 and the adhesion or fusion layer 10 being disposed therebetween are passed between upper and lower heating rolls 7 and 8 as shown in FIG. 5 so that the two tape members 9, 11 may be heated to 130° to 150° C. and joined together into an integral tape unit. In this operation, each of the magnetized wires 12 is pressed into the adhesion or fusion layer 10 and substantially one-half of the wire body is embedded therein and firmly secured in place. The maximum spacing *d*, between the magnetic wires 12 is 0.15 millimeter when this process is employed.

A spacing in pitch of about 0.2 millimeter is preferable from the point of view of electrical properties of the wire memory plane. Theoretically, as many core wires as desired may be used, but the apparatus becomes oversized when too many wires are used. Therefore, a tape generally includes about 120 digit wires arranged parallel with one another. If a larger number of digit wires are required, a plurality of tapes may be joined together to provide a composite wire with a desired number of digit wires.

The word line tape is prepared by the same process as described hereinabove with reference to a digit wire tape except that rectangular strip wires (serving as word lines) 13 which are 0.7-millimeter wide and 0.04-millimeter thick are used instead of magnetized round wires. Spacing *d2* between the adjacent strip wires 13 is 0.05 millimeter minimum. However, the results of experiments show that the spacing *d2* is preferably over 0.3 millimeter from the point of view of electrical properties of the wire memory plane.

It is to be understood that both the digit wire tape and the word line tape can be prepared, as explained previously, by other processes than pressing while heating.

Figure 8:
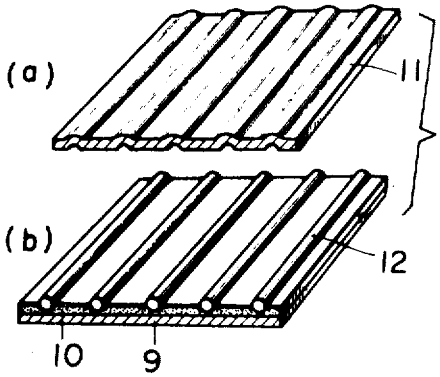
FIG. 8 is a perspective view showing the manner in which the tape portion having no adhesion or fusion layer is stripped off from the tape of FIG. 6, FIG. 8*a* showing the tape portion that is stripped off and discarded and FIG. 8*b* showing the tape portion having digit wires attached thereto which is used in subsequent operations in the present invention.
Figure 9:
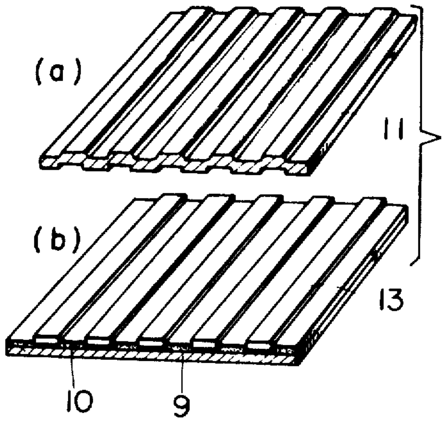
FIG. 9 is a perspective view showing the manner in which the tape portion having no adhesion or fusion layer is stripped off from the tape of FIG. 7, FIG. 9*a* showing the tape portion that is stripped off and discarded and FIG. 9*b* showing the tape portion having word lines attached thereto which is used in subsequent operations in the present invention.

The tape portion 11 having no adhesion or fusion layer joined thereto can be stripped off from the digit wire tape and the word line tape as shown in FIG. 8 and FIG. 9 because of the poor bond between polyethylene and polyester. In stripping off the tape portion 11, there is no danger of displacement of the magnetic wires 12 and the strip wires 13, since substantially one-half the body of each magnetic wire 12 and each strip wire 13 is embedded in the adhesion or fusion layer 10 as the result of being pressed by rollers.

Figures 10, 11, 12:
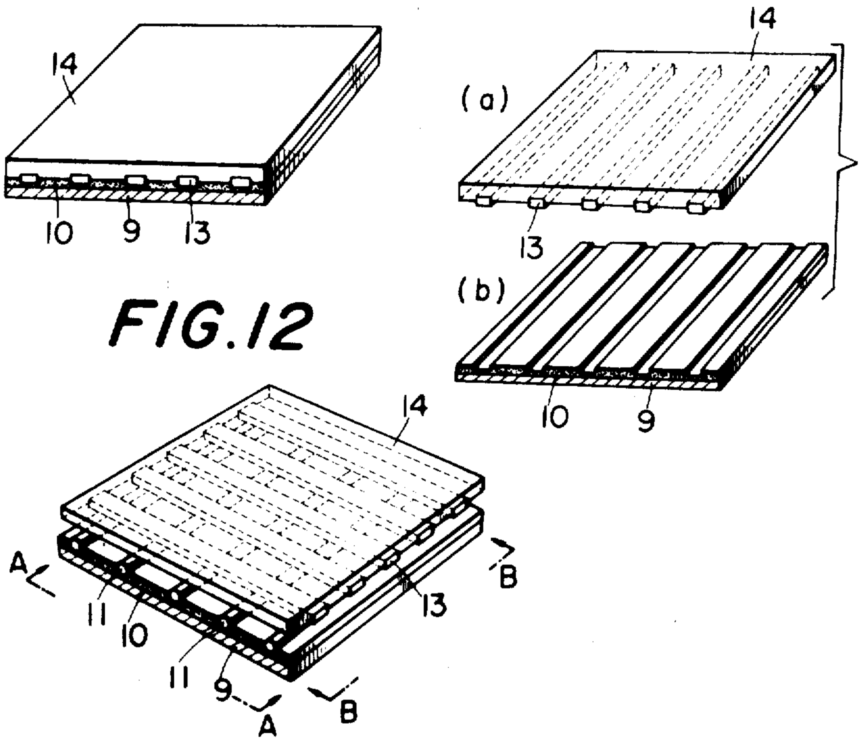
FIG. 10 is a perspective view of the tape portion of FIG. 9*b* with an additional resin layer being formed on the surface on which the word lines are exposed.
FIG. 11 is a perspective view showing the manner in which the tape portion having an adhesion or fusion layer thereon is stripped off from the resin layer of FIG. 10, FIG. 11*a* showing the resin layer portion having word lines attached thereto and FIG. 11*b* showing the tape portion that is stripped off and discarded.
FIG. 12 is a perspective view showing the tape portion of FIG. 8*b* and the resin layer portion of FIG. 11*b* being superimposed over the other such that the surfaces thereof on which the digit wires and the word lines are exposed face each other with the digit wires and word lines being disposed in right-angle relationship with one another.

A layer 14 of thermosetting resin, such as an epoxy resin, for example, or a thermoplastic resin, such as vinyl paste, is applied in any thickness as desired to the surface of the tape portion of FIG. 9*b* on which the strip wires 13 are exposed as shown in FIG. 10. The layer of resin on the tape portion is joined integrally with the tape portion when it is caused to set by heating at a temperature at which the polyethylene forming the adhesion or fusion layer 10 is not fluidized or below 60° C. to be on the safe side. Then, the tape portion having the adhesion or fusion layer is stripped off to provide a resin layer portion 14 having multiple strip wires 13 arranged thereon in parallel relation or a word line plate. The tape portion having the polyethylene layer 10 joined hereto can be readily stripped off because the bonding strength between the polyethylene layer 10 and the strip wires 13 is lower than the bonding strength between the epoxy resin layer 14 and the strip wires 13.

Figure 13:
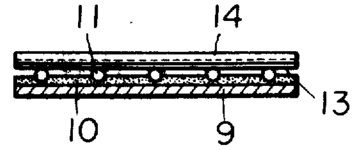
FIGS. 13 and 14 are views in section taken along the lines A—A and B—B respectively of FIG. 12.
Figure 14:
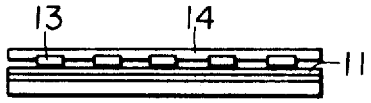
Figure 15:
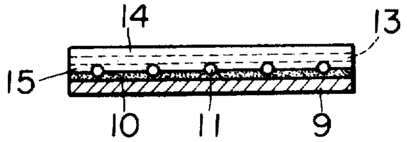
FIGS. 15 and 16 are views similar to FIGS. 13 and 14 respectively but showing the upper and lower tape portions joined together by a resin layer to provide an integral tape unit.
Figure 16:
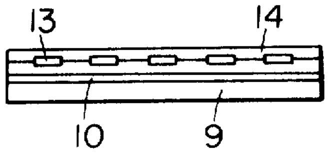

The word line plate shown in FIG. 11*a* and the tape shown in FIG. 8*b* are laid one over the other such that the magnetic wires 12 and the strip wires 13 are disposed in contact with one another in right-angle relation as shown in FIGS. 12 to 14. A very thin coat of insulating enamel paint, such as polyurethane, for example, may be applied at this time to both the magnetic wires 12 and the strip wires 13 or at least either one of them so as to prevent a short circuit between the magnetic wires 12 and the strip wires 13, said coat of enamel paint having a thickness of 2 to 4 $\mu$. The magnetic wires 12 and the strip wires 13 may, of course, be coated with an enamel layer in the beginning. Then, a thermosetting resin 15, such as an epoxy resin, for example, is employed to join the word line plate and the digit wire tape The tape portion having the adhesion or fusion layer attached thereto is stripped off from this unit consisting thereto is stripped off from this unit consisting of the word line plate and the digit wire tape as shown in FIG. 17 and FIG. 18. A word line plate shown in FIG. 11*a* is then laid over the unit such that the surface of the former on which the strip wires 13 are exposed faces the surface of the latter on which the magnetic wires 12 are exposed, said strip wires 13 and said magnetic wires 12 being arranged in contact with said right-angle relationship with one another. At this time, a coat of enamel paint may be applied to the trip wires 13 and the magnetic wires 12 in order to prevent a short circuit between them. Then, a thermosetting resin 15, such as epoxy resin, for example, is employed to form the two members into an integral unit. In this way, a wire memory plane shown in FIGS. 19 and 20 can be manufactured. The wire memory plane manufactured as aforementioned can be used as a memory device for electronic computers after terminals are formed therein.

EMBODIMENT 2

The magnetic properties of the magnetic wires 12 of a wire memory plane may deteriorate due to an internal strain caused by a stress applied thereto from outside or a fluctuation in temperature (caused primarily by a difference in coefficient of expansion between the magnetic wires and the epoxy resin disposed adjacent thereto at different temperature levels). The construction of the wire memory plane described above as Embodiment 1 is such that it is impossible to substitute fresh magnetic wires for those magnetic wires that have been deteriorated in magnetic properties. However, a wire memory plane having the so-called tunnel construction permits to effect replacement of the magnetic wires. A method of manufacturing a wire memory plane of this type will now be explained.

A wire memory plane is manufactured by the same process as explained hereinabove with reference to Embodiment 1 but with dummy wires formed of a ductile metal, such as soft copper, soft phosphor bronze or the like and having a slightly (5 to 50 $\mu$) larger diameter replacing the magnetic wires 12. After the wire memory plane has been manufactured, the dummy wires are withdrawn therefrom and the magnetic wires 12 are inserted in bores 16 formed by removing the dummy wires. What results is a wire memory plane shown in FIGS. 21 and 22 which permits replacement of the magnetic wires 12.

EMBODIMENT 3

If the magnetized wires in a wire memory plane could be protected from internal and external stresses, it would be unnecessary to adopt the so-called tunnel construction as explained with reference to Embodiment 2. A wire memory plane having a buffer construction so as to render the magnetic wires immune from stresses, will now be explained.

A coat 17 of insulating material, such as latex rubber, a soft urethane resin or the like which is soft and resilient is applied, in a thickness ranging from 3 to 5 $\mu$, to the magnetic wires and such coated magnetic wires are employed as column wires in manufacturing a wire memory plane by the same process as described with reference to Embodiment 1. What results in a wire memory plane having digit wires protected against shocks as shown in FIGS. 23 and 24.

EMBODIMENT 4

A wire memory plane may also be manufactured by laying two word line plates, obtained in the process of Embodiment 1 and shown in FIG. 11*a*, one over the other such that the surfaces on which the word lines are exposed are in face-to-face relation with each other, arranging digit wires (magnetic wires 12 having a coat of insulating enamel applied thereto) between said two word line plates such that the digit wires are disposed at right angles to the word lines, and embedding said digit wires in a resin layer 15 formed between said two word line plates by using a thermosetting resin or thermoplastic resin to provide integral wire memory plane. In arranging the digit wires between the two word line plates, dummy wires 18 are placed between the digit wires in order that the digit wires may positively be disposed parallel to one another. FIG. 25 shows the construction of a wire memory plane manufactured by the process described above. The dummy wires 18 employed for the purpose described may be of any type so long as they are linear and have good dielectric properties. One example of the dummy wires that meet these requirements is a glass wire.

In the present embodiment, magnetic wires with a diameter of 0.1 millimeter and parallel glass wires with a diameter of 0.1 millimeter are alternately arranged on a smooth glass plate or polytetra-fluoroethylene (Teflon) plate, with the pitch between the magnetic wires being 0.2 millimeter. Such wires are secured in place parallel to one another by using a butyral paint or polyurethane paint. If the process of Embodiment 2 described above is employed in conjunction with the process of the present embodiment, it will be possible to readily obtain a wire memory plane of the tunnel construction type. Also, if the process of Embodiment 3 is employed in conjunction with the process of the present embodiment, it will be possible to readily obtain a wire memory plane of the buffer-construction type.

The process of Embodiment 4 has particular utility in manufacturing several types of wire memory planes in small quantities, such as manufacturing a plurality of groups of wire memory planes differing from one another in the pitch between the digit wires. In this embodiment, it is impossible to attain high precision in the pitch between the digit wires such as 100 wires of a diameter of 0.1 millimeter being arranged with an error of only about 0.1 millimeter that is possible when a wire memory plane is manufactured by applying a method of manufacturing ribbonlike multiple core wires to a method of manufacturing wire memory planes.

Although the invention has been described with reference to embodiments in which round wires are used as digit wires and rectangular wires are used as word lines in conformity with general practice, it is to be understood that the invention is not limited to the particular type of wires described. It is also to be understood that the thermoplastic resin, thermosetting resin, insulating enamel paint, and soft and resilient insulating material that have been described are merely shown by way of example and that the invention is not limited to the particularly types of materials described hereinabove with reference to the embodiments.

From the foregoing description, it will be appreciated that by applying a method of manufacturing ribbonlike multiple core parallel wires to a method of manufacturing wire memory planes, the present invention makes it possible to attain high precision in arranging word lines and digit wires parallel to one another (made possible by high precision in the pitch between the wires), thereby permitting to improve bit density and reduce spacing between the word lines and the digit wires so as to achieve improved memory characteristics. The invention makes it possible to readily manufacture wire memory planes of the tunnel construction type by employing dummy wires having a diameter larger than the diameter of the digit wires and substituting magnetic wires for said dummy wires after the wire memory plane is manufactured. The wire memory plane of the tunnel construction type manufactured by the method according to this invention is characterized by the arrangement of magnetic wires of any diameter as described parallel to one another and with a correct pitch between them. Thus, the wire memory plane of the tunnel construction type provided by this invention permits to markedly reduce spacing between the digit wires and the word lines, thereby markedly improving memory characteristics.

The wire memory manufactured according to this invention can be made to have improved magnetic properties by mixing powdered carbonyl iron in a layer of resin deposited on the surface of the tape portion on which the word lines are exposed in preparing a parallel word line plate, because finely crushed powder of high permeability can be arranged between the word lines.

An additional advantage of the present invention lies in the fact that wire memory planes of high quality as aforementioned can be produced relatively readily and at low cost.

FIG. 26 shows a parallel conductor plate obtained by using a method of manufacturing wire memory planes according to this invention. Such parallel conductor plate can be used as an electrode for electrostatic printing equipment after polishing its cross-sectional surfaces. The parallel conductor plate shown comprises a resinous layer 14 and conductors 19. In preparing such a plate, conductors are used in place of digit wires for preparing a parallel conductor tape as shown in FIG. *8b* ans a resin layer portion having word lines attached thereto as shown in FIG. **11*a*** is prepared. A resin layer is then formed integrally on the surface of said resin layer portion on which the conductors are exposed. Such a parallel conductor plate is also included in the scope of and by the present invention.

We claim:

1. A method of making a wire memory plane which comprises:

a. adhesively attaching a plurality of straight wires in spacedly parallel position to respective surfaces of each of two sections of flexible tape, whereby two word line tapes are produced, each word line tape including a tape section having adhesively secured wires exposed on one flat surface thereof;

b. depositing a layer of a first thermosetting or thermoplastic resin composition in a deformable condition on said one surface of each of said word line tapes conforming engagement with said exposed wires;

c. causing said layers to harden and thereby to bond to said exposed wires, whereby the hardened layers and the wires bonded thereto form two word line plates, said bonded wires being exposed on respective surface of said hardened layers as word lines;

d. stripping said tape sections from said word line plates;

e. adhesively attaching a set of straight wires in spacedly parallel relationship on a surface of another flexible tape;

f. superimposing the attached wires of said set on the exposed wires on a surface of one of said two word line plates in a position in which the wires of said set are elongated at right angles to the parallel word lines of said one word line plate;

g. inserting a portion of a second thermoplastic or thermosetting resin composition between the surfaces of said one word line plate and said other flexible tape while in deformable condition;

h. causing the inserted composition to harden and thereby to bond the wires of said set to said exposed wires of said one word line plate;

i. stripping said other tape from the bonded wires, whereby the bonded wires of said set are exposed;

j. superimposing the bonded wires of said set at right angles on the exposed wires of the other word line plate;

k. inserting the remainder of said second resin composition between the hardened portion of said second composition and the surface of said other word line plate on which wires are exposed while said remainder is in deformable condition; and l. causing said remainder to harden and thereby to bond said hardened first portion to said other word line plate, whereby said portions constitute a layer of said second resin composition joining said word line plates.

2. A method as set forth in claim 1, wherein said first composition contains a finely dispersed powder of high permeability.

3. A method as set forth in claim 1, wherein the wires of said set are withdrawn from the layer of said second resin composition adjoining said word line plates, and are replaced by digit wires of smaller diameter inserted in the bores formed by withdrawal of the wires of said set.